United States Patent

Miller

[11] 3,718,966
[45] March 6, 1973

[54] TUBE EXTRACTING MECHANISM
[75] Inventor: Charlie D. Miller, Syracuse, N.Y.
[73] Assignee: Carrier Corporation, Syracuse, N.Y.
[22] Filed: July 16, 1971
[21] Appl. No.: 163,219

[52] U.S. Cl.....................................29/234, 29/256
[51] Int. Cl. ...............................................B23p 19/04
[58] Field of Search........29/234, 244, 255, 256, 282, 29/157.4; 10/1 R; 81/53.2, 71

[56] References Cited

UNITED STATES PATENTS

| 2,300,914 | 11/1942 | Flindt | 29/234 |
| 2,641,378 | 6/1953 | Wilt | 29/256 X |

Primary Examiner—Granville Y. Custer, Jr.
Assistant Examiner—J. C. Peters
Attorney—Harry G. Martin, Jr. et al.

[57] ABSTRACT

The invention has to do with a mechanism for extracting heat exchanger tubes from heat exchangers. A drawbar has threaded engagement with a sleeve journaled in a housing. A tube pulling tap is connected to the drawbar and initially extends outwardly from the housing for threaded engagement with the tube. The sleeve is provided for a connection to a power driver such as an impact wrench. Means is provided to restrain rotation of the drawbar and tap relative to the housing. A clutch serves to initially connect the sleeve to the housing so they rotate in unison to thread the tap into the tube to be extracted. Thereafter the clutch is disengaged and the sleeve is rotated separately to draw the tap and tube into the housing while the end of the housing is positioned against the tube sheet.

7 Claims, 5 Drawing Figures

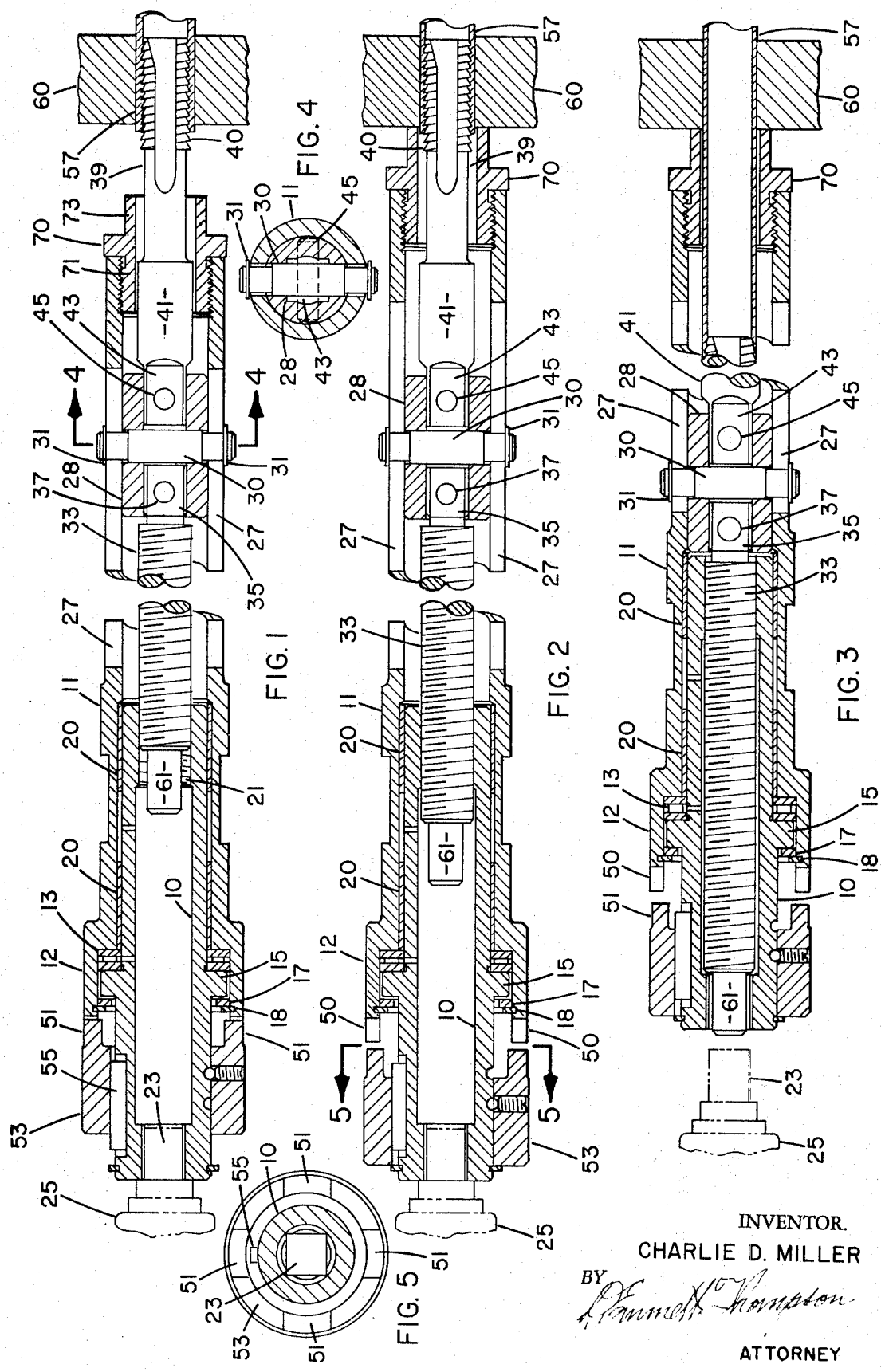

TUBE EXTRACTING MECHANISM

BACKGROUND OF THE INVENTION

In one type of heat exchanger, such as condensers and evaporators in refrigeration systems, the ends of the tubes are expanded in leak proof engagement with the tube sheets in the ends of the heat exchanger. On occasion it is necessary to replace tubes which have become defective. That requires drawing the defective tubes outwardly from one of the tube sheets. Such heat exchangers are often fabricated with several hundred tubes. Invariably the retubing operation is carried on at the place in which the heat exchanger is installed. Accordingly, a great deal of time and effort is necessarily expended in retubing a heat exchanger.

The time and effort expended in extracting tubes from heat exchangers are greatly reduced by employing the tap in my co-pending application Ser. No. 843,361, filed July 22, 1969. Upon initial application of outward axial force on the tap, threaded into a tube end, the tap functions to initially effect a contraction of the tube end which was expanded tightly in the tube sheet. The result is that the tube can then be pulled from the tube sheet by the application of outward axial force of only a fractional part of the force required with the use of prior taps.

This invention has as an object a particularly compact lightweight power operated mechanism which is conveniently manually manipulated to thread the tap into the tube, and thereafter withdraw the tube through the tube sheet.

SUMMARY OF THE INVENTION

A sleeve is journaled in one end portion of a tubular housing. A drawbar has threaded engagement with the inner end portion of the sleeve. A coupling is attached to the inner end of the drawbar, and the tube extracting tap is attached to the coupling. The coupling and housing have means cooperable to restrain rotation of the coupling, and accordingly the drawbar and tap, relative to the housing. A clutch is provided for connecting and disconnecting the sleeve to the housing. Initially the tap extends outwardly from the opposite end of the housing. The clutch is engaged and a power driver is connected to the sleeve whereby the housing and sleeve, together with the coupling and tap, rotate in unison for threading the tap into the end of the tube to be extracted. Thereafter the clutch is disengaged and the sleeve rotated by the driver to move the drawbar and tap axially into the housing which then abuts against the tube sheet and, accordingly, the tube is drawn into the housing. Subsequently the clutch is re-engaged, the driver reversed, and the tap unthreaded from the tube. There is then a portion of the tube projecting from the tube sheet for the convenient attachment of any means for then withdrawing the tube completely from the tube sheet.

BRIEF DESCRIPTION OF THE DRAWINGS

FIG. 1 is a lengthwise sectional view of a tube extracting mechanism embodying my invention with the tap threaded into the tube.

FIG. 2 is a view similar to FIG. 1 and in which the inner end of the housing has been moved into abutting engagement with the tube sheet upon rotation of the sleeve.

FIG. 3 is a view showing the tube drawn outwardly from the tube sheet into the housing.

FIG. 4 is a view taken on line 4—4, FIG. 1, and

FIG. 5 is a view taken on line 5—5, FIG. 2.

DESCRIPTION OF THE PREFERRED EMBODIMENT

A sleeve 10 is journaled in the outer end portion of a housing 11. The outer end of the housing 11 is formed with an enlargement 12 counter bored to form a shoulder against which a thrust bearing 13 is positioned. The sleeve 10 is formed with a radial flange 15 engaging the thrust bearing 13. The sleeve is restrained against outward axial movement in the housing by an annular member 17 positioned between the flange 15 and a snap ring 18 positioned in a groove formed counter bore of the enlargement 12. With this arrangement, the sleeve 10 is restrained from axial movement in the housing 11 and is rotatably mounted in sleeve bearings 20.

The inner end portion of the bore of the sleeve is threaded as shown at 21. The outer end of the sleeve 10 is formed with a noncircular aperture to receive the driver 23 of a power tool such as an impact wrench 25.

The inner portion of the housing 11 is formed, in the side wall thereof, with a pair of elongated slots 27. A coupling member 28 is slidably mounted in the bore of the housing and is formed with a transversely extending aperture to receive a pin 30, the ends of which extend through the slots 27 and are provided with snap rings 31 to limit axial movement of the pin 30.

The coupling 28 is also formed with an axially extending noncircular aperture. An externally threaded drawbar 33 is formed with an end portion 35 complemental in cross section to the aperture in the coupling member 28, and is fixed thereto by a tranversely extending pin 37, the end portion of the drawbar 33 being positioned at one side of the pin 30. The tube extracting tap 39 is formed with a threaded portion 40 and a shank 41, which terminates in a noncircular end portion 43, and of a configuration complemental to the axially extending aperture in the coupling 28 and is attached thereto by a pin 45.

It will be apparent with this arrangement the drawbar 33, coupling 28 and the tap 40 are restrained against rotation relative to the housing 11. However, those components are movable axially in the housing a distance comparable to the length of the slots 27.

The outer end edge of the housing enlargement 12 is formed with notches 50 for the reception of prongs 51 formed on the confronting end of a jaw clutch sleeve 53 mounted on the outer end portion of the sleeve 10, and being slidable axially thereof to move the prongs 51 in to and out of engagement with notches 50. One or more keys 55 serve to restrain rotation of the clutch member 53 relative to the sleeve. In FIG. 1, the clutch structure is engaged. In FIG. 2 the sleeve 53 is moved outwardly and the clutch disengaged.

With the clutch engaged as shown in FIG. 1, rotation is imparted to both the sleeve 10 and the housing 11 by the driver 25 which, as will be apparent, effects rotation of the tap 40 for threading engagement with the heat exchanger tube 57. The length of the threaded portion of the tap exceeds the axial length of that portion of the tube end which is expanded into tight engagement with the tube sheet. It will be understood that the portion of the tube expanded against the tube sheet may be substantially less than the thickness of the tube sheet. Usually the area of the tube that is expanded is in the neighborhood of three quarters of an inch in axial length, where the tube sheet may have a thickness of two or three inches. In any event, one or two threads toward the shank end of the tap are left exposed from the end of the tube in order that, upon initial axial outward movement of the tap, the threads of the tap will pare the metal on the inner surface of the tube inwardly to effect contraction of the tube as set forth in my prior patent referred to.

Following the threading of the tap into the tube, the clutch member 53 is disengaged from the housing and the sleeve 10 is rotated by the driver 25. Upon rotation of the sleeve 10, relative axial movement is effected between the drawbar and the housing. Initially, as shown in FIG. 2, the housing is moved inwardly until it abuts against the tube sheet 60. Thereafter, with continuous application of power by driver 25, the coupling 28, the tap 40 and the tube 57 are drawn into the housing as shown in FIG. 3.

The outer end 61 of the drawbar 33 is of reduced diameter and dimensioned for entrance into the aperture at the outer end of the sleeve 10. In doing so, it pushes the driver 23 out of engagement with the sleeve. This happens prior to the pin 30 engaging the outer ends of the slots 27 and also prior to the engagement of the coupler 28 with the inner end of the sleeve. Accordingly, the drawbar cannot be run outwardly to a position resulting in tightening or jamming of the drawbar and an associated structure.

Normally the mechanic will stop the driver 25 during the drawing of the tube from the tube sheet before the end 61 of the drawbar pushes the driver 23 out of engagement with the sleeve 10. He can conveniently do so by simply observing the position of the pin 30 in the slots 27.

When the tube 57 has been pulled outwardly from the tube sheet 60 a distance comparable to the major portion of the threaded length of the drawbar, the clutch structure 50-51 is re-engaged and the driver 25 reversed. Reverse rotation of the housing and sleeve effects removal of the tap from the tube. Following disengagement of the apparatus from the pulled out tube, the clutch is again disengaged and the driver 25 operated in reverse to move the drawbar, coupling 28, and the tap 39 inwardly to about the position shown in FIG. 1 for engagement with the next tube to be pulled. During this return movement of the parts, jamming of the drawbar is also prevented in that the outer end of the threaded portion of the drawbar will pass out of the threaded area 21 of the sleeve 10 prior to the pins 30 engaging the inner ends of the slots 27.

The heat exchanger tubes vary in diameter. The ends of the tubes protrude a short distance from the outer face side of the tube sheet. In order to provide proper engagement of the inner end of the housing with the tube sheet 60, and to provide a proper guide for the shank 41 of the tap while it is being threaded into the tube 57, and to provide proper clearance for the tube while it is being drawn into the housing, an end member 70 is detachably mounted on the inner end of the housing.

The end member 70 is formed with an externally threaded cylindrical portion 71 having threaded engagement with the inner end of the housing 11. At its opposite end, the end member is formed with a cylindrical portion 73 for engaging tube sheet 60. The end member is formed with a cylindrical bore which is dimensioned for sliding fit with the shank 41 of the tap, the dimension providing clearance for the tube as it is pulled into the housing.

The apparatus embodies a compact lightweight structure which can be conveniently manipulated in one hand while the driver 25 is held on the other hand. The tube 57 is drawn from the tube sheet 60 in a matter of seconds and with little expenditure of effort on the part of the operator.

While a preferred embodiment of this invention has been described for purposes of illustration, it will be appreciated that this invention may be otherwise embodied within the scope of the following claims.

I claim:

1. Mechanism for extracting tubes from a tube sheet comprising an elongated housing formed with a passage extending lengthwise thereof, a tube extracting tap mounted in said passage with the threaded portion of said tap extending outwardly from one end of said housing, means connecting said tap to said housing for rotation therewith whereby upon rotation of said housing, said tap is threaded into the tube and said one end of said housing is moved against the tube sheet, and power operated means connected to said tap and operable to effect movement thereof and the tube axially through said passage.

2. Mechanism as set forth in claim 1, wherein said means connecting said tap to said housing includes a coupling member connected to said tap and means cooperable with said coupling member and housing to prevent relative rotation between said coupling and the housing.

3. Mechanism as set forth in claim 1, wherein said power operated means includes an externally threaded drawbar member operatively connected at one end of said tap, a sleeve journaled in said housing and having threaded engagement with said drawbar member and means restraining said sleeve against axial movement in said housing.

4. Mechanism as set forth in claim 1, wherein a tubular end fitting is detachably secured to said one end of said housing and arranged in registration with the passage therein.

5. Mechanism for extracting tubes from tube sheets comprising an elongated housing member formed with a passage extending axially therethrough, a sleeve member journaled in one end portion of said housing member, means restraining said sleeve member from axial movement relative to said housing member, a coupling positioned in said passage at the opposite end portion of the housing member, a tube extracting tap connected to said coupling for rotation therewith, the threaded portion of said tap extending outwardly from said opposite end of the housing member, an externally threaded drawbar operatively connected at one end to said coupling, the opposite end of said bar extending into the inner end of said sleeve and having threaded engagement therewith, the outer end of said sleeve having means for engagement with a power driver for effecting rotation of said sleeve, clutch means for connecting and disconnecting said sleeve to said housing, said sleeve member and housing member being rotatable in unison upon engagement of said clutch, means cooperable with said coupling and said housing member to restrain relative rotation between said coupling and housing while permitting axial movement of said coupling in said housing whereby upon engagement of said clutch, said housing and coupling are rotated in unison by said driver to thread said tap into a tube and move said opposite end of said housing against said tube sheet, and upon disengagement of said clutch to effect rotation of said sleeve to draw said coupling, tap and tube into said housing.

6. Mechanism as set forth in claim 5, wherein said clutch means includes a clutch element mounted on the outer end of said sleeve for rotation therewith and being shiftable axially of said sleeve in to and out of clutching engagement with said housing.

7. Mechanism as set forth in claim 5, wherein the outer end of said sleeve is provided with a socket for operatively receiving a power driver, the axial length of said drawbar exceeding the axial length of said sleeve whereby said opposite end of said bar engages said power driver and expels the same from said socket prior to said coupling engaging the inner end of said sleeve.

* * * * *